United States Patent Office 2,986,691
Patented May 30, 1961

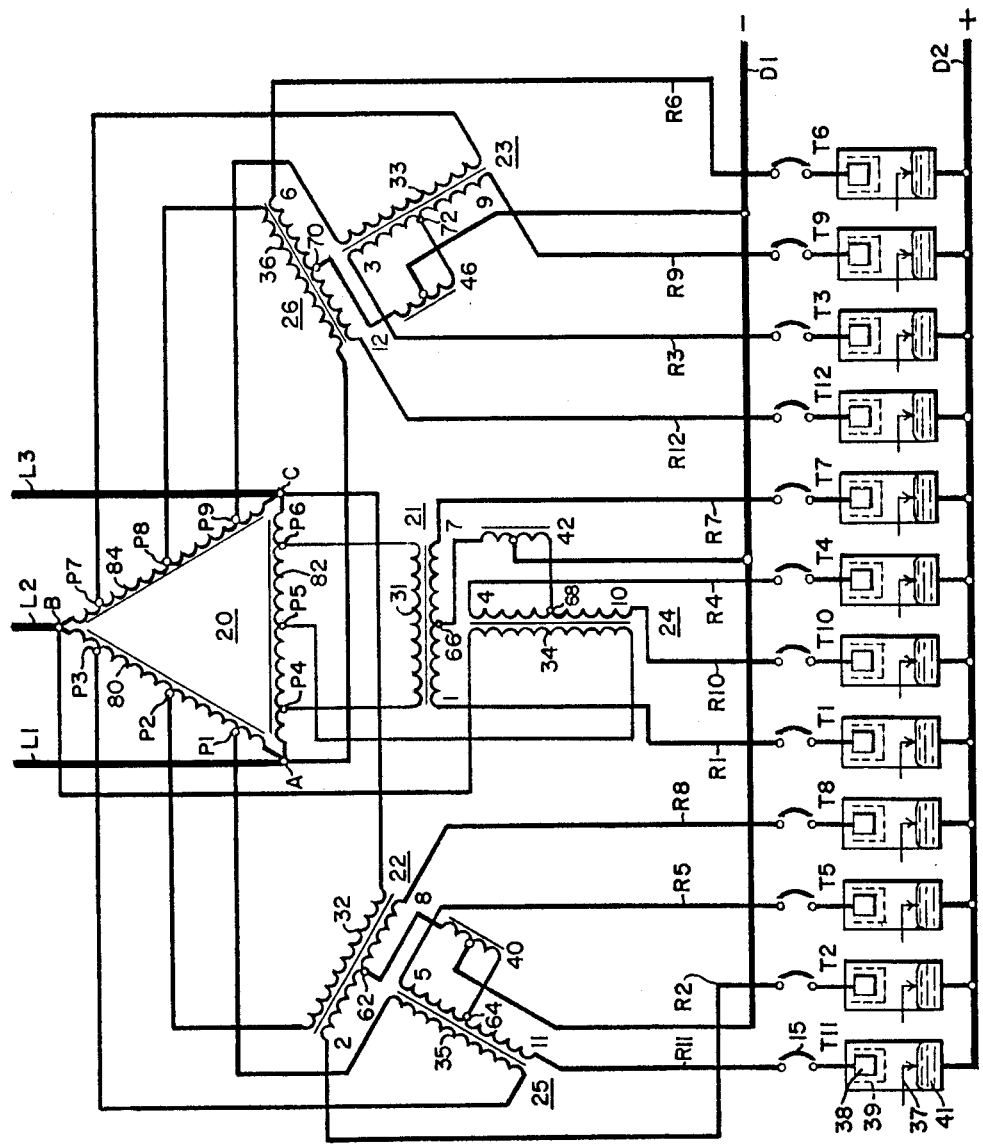

2,986,691
ELECTRIC POWER TRANSLATION SYSTEM

Francis D. Kaiser, Sharon, Pa., assignor to Westinghouse Electric Corporation, East Pittsburgh, Pa., a corporation of Pennsylvania Filed July 24, 1957, Ser. No. 673,884

12 Claims. (Cl. 321—5)

This invention relates to electric power translation systems of the type in which a plurality of asymmetrically-conducting devices are used to interchange power, in one direction or the other, between a first polyphase system and a second system which may be either a direct-current system or an alternating-current system having a frequency which is different from the first polyphase system.

It has been found that the maximum current rating of certain asymmetrically-conducting devices, such as semiconductor rectifiers and large ignitrons, is determined more by the peak current rather than the average current carried by such devices. In order to take greater advantage of the current-carrying capacity of said devices, it is desirable that each device have a lower peak current and also conduct for longer periods during each cycle of the alternating-current electric power interchanged in a translation system. It is also desirable in a translation system used to convert polyphase alternating-current to a unidirectional current that the alternating current applied to the asymmetrically-conducting devices include a larger plurality of phases in order to obtain a smoother unidirectional current at the output of the translation system.

It is an object of this invention to provide a new and improved electric power translation system.

Another object of this invention is to provide a new and improved connection arrangement between a transformer means and a plurality of asymmetrically-conducting devices in a translation system for electric power.

Another object of this invention is a new and improved electric power translation system in which a plurality of asymmetrically-conducting devices each conducts for a longer period of each cycle of the alternating-current electric power interchanged and a larger number of phases of the alternating-current are applied to said devices so that a plurality of said devices instantaneously operates in parallel to carry the total current handled by said translation system.

A more specific object of this invention is to provide a triple-Scott, twelve-phase, double-diametric circuit connection between a transformer means and a plurality of asymmetrically-conducting devices, in which the current rating of said devices is determined more by the peak current than by the average current carried by said devices, in order to take greater advantage of the current-carrying capacity of said asymmetrically-conducting devices.

Other objects of the invention will, in part, be obvious and will, in part, appear hereinafter.

For a fuller understanding of the nature and objects of the invention, reference should be had to the following detailed description taken in connection with the accompanying drawing, in which the single figure diagrammatically illustrates this invention.

Referring to the drawing, there is illustrated an electric power translation system of the type in which power is taken from a three-phase power supply system, including the power leads L1, L2 and L3, and is transmitted through a plurality of asymmetrically-conducting devices to a unidirectional current load circuit, having the power leads D1 and D2. The invention will be described as if the power is transferred from the three-phase power leads L1, L2 and L3 to the unidirectional current power leads D1 and D2, but it is to be understood that by the use of well-known inverter control connections, the direction of power flow could be reversed. The unidirectional current power leads D1 and D2 will be described as if they were a direct-current power line which receives power from the three-phase power line at L1, L2, and L3, but it is to be understood that the unidirectional current line at D1 and D2 could be either the anode terminal circuit or the cathode terminal circuit of one phase (or the phase) of a second different frequency alternating-current system which receives power from or which transmits power to the three-phase system at L1, L2 and L3 provided that suitable rectifier controlling means are provided.

The plurality of asymmetrically-conducting devices is illustrated as comprising twelve ignitron tubes T1 to T12, which may be taken to be broadly representative of twelve single-phase asymmetrically-conducting devices of a type in which the rating of each device is determined more by its peak current than by its average current. Each ignitron tube comprises a main anode 38, a grid 39, an ignitor 37 and a mercury or other vaporizable cathode pool 41. The twelve cathode leads of the tubes T1 to T12 are illustrated as being all connected to the positive conductor D2 of the direct-current bus. The twelve anode leads of the tubes T1 to T12 comprise twelve rectifier leads R1 to R12, respectively, the leads and the tubes being numbered in accordance with the sequence of the phases in a twelve-phase circuit.

The transformer means which is provided as part of the translation system comprises a three-phase autotransformer 20 and six, single-phase, two-winding transformers 21, 22, 23, 24, 25 and 26. The autotransformer 20 may comprise a three-phase power transformer as shown or three single-phase power transformers. In general, the autotransformer 20 and the six single-phase transformers 21 to 26 are connected between the three-phase power-supply system at the power leads L1, L2 and L3 and the rectifier leads R1 to R12 to apply twelve-phase, alternating-current electric power to the ignitron tubes T1 to T12, respectively. The autotransformer 20 comprises three phase windings 80, 82 and 84 which are connected in a delta arrangement, the three-phase power-supply system at L1, L2 and L3 being connected at the terminals A, B and C, respectively, of the autotransformer 20. The phase winding 80 of the autotransformer 20 includes a mid-tap at P2 and two additional symmetrically placed taps at P1 and P3, the voltage between the taps P1 and P3 being 86.6% of the voltage between the terminals A and B of the autotransformer 20. In similar fashion, the windings 82 and 84 include taps P4, P5, P6, P7, P8 and P9, respectively.

The primary windings 33 and 36 of the single-phase transformers 23 and 26, respectively, are connected to the automtransformer 20 in a modified form of the well-known Scott connection which transforms a three-phase voltage to a two-phase voltage. In particular, the primary winding 36 of the transformer 26 is connected between the terminal A and the mid-tap P8 of the phase winding 84 of the automtransformer 20. The primary winding 33 of the transformer 23 is connected to the taps P7 and P9 of the phase winding 84 of the autotransformer 20. Assuming that the voltages between the terminals A, B and C of the autotransformer 20 are substantially balanced, the voltage between the terminal A and the tap P8 of the autotransformer 20 will be 86.6% of the voltage between the terminals B and C of the autotransformer 20. As previously explained, the voltage between the taps P7 and P9 of the winding 84 of the autotransformer 20 will also be 86.6% of the voltage between the terminals B and C of the autotransformer 20. Therefore, the magnitude of the voltages applied to the primary windings 33 and 36 of the transformers 23 and 26, respectively, will be the same. In accordance with the well-known theory of the Scott connection, there will be a 90° phase difference between the two voltages applied to the primary windings 33 and 36 of the transformers 23 and 26, respectively. Therefore, there will also be a 90° phase difference between the voltages appearing across the secondary windings 3—9 and 6—12 of the transformers 23 and 26, respectively. In similar fashion, the primary windings 32 and 35 of the transformers 22 and 25, respectively, are connected to the autotransformer 20 so as to produce across the secondary windings 2—8 and 5—11 of the transformers 22 and 25, respectively, voltages which are equal in magnitude but 90° out of phase. The primary windings 31 and 34 of the transformers 21 and 24, respectively, are also connected to the autotransformer 20 so as to produce across their secondary windings 1—7 and 4—10, respectively, voltages which are equal in magnitude, but 90° out of phase. The two-phase output voltages from the transformers 23 and 26 will be either 120° or 30° out of phase with the output of the transformers 21 and 24 and also either 120° or 30° out of phase with the output of the transformers 22 and 25, respectively. This is because the voltages in the autotransformer 20, to which each pair of the transformers 23 and 26, 21 and 24, and 22 and 25 are connected, are also each 120° out of phase. The diametrically opposite ends of the secondary windings of each of the transformers 21 to 26 are each connected through one of the rectifier leads R1 to R12 to one of the ignitron tubes T1 to T12, respectively, through a suitable anode circuit breaker 15.

In common with other polyphase rectifier systems, the rectifier connections described above are such that different rectifier phases, which are energized by the instantaneous voltages of different phases of the polyphase circuit, are at times operated in parallel with each other so as to simultaneously supply power to or receive power from the same unidirectional current power circuit or bus. As is well known in the art, it is therefore necessary to provide suitable interphase transformer or reactance means 40, 42 and 46 which are connected between the mid-taps of the secondary windings 2—8 and 5—11 of the transformers 22 and 25, respectively, between the mid-taps of the secondary windings 1—7 and 4—10 of the transformers 21 and 24, respectively, and between the mid-taps of the secondary windings 3—9 and 6—12 of the transformers 23 and 26, respectively. As illustrated, the mid-taps of the interphase reactances 40, 42 and 46 are then connected to the negative bus D1 of the unidirectional current system to provide a return path for the unidirectional current which flows from the ends of the secondary windings of the transformers 21 to 26. Each of the interphase reactances 40, 42 and 46 comprises a mid-tapped winding disposed on a magnetic core. The interphase reactances 40, 42 and 46 are provided to develop the instantaneous voltage differences which are necessary to permit the parallel operation of two or more rectifier phases having terminal voltages which do not reach their peaks at the same instant and yet allow independent operation of the parallel rectifier phases. The interphase reactances 40, 42 and 46 are capable of absorbing or developing the necessary alternating current voltage differences or ripple voltages to permit the parallel operation of a plurality of rectifier phases. For example, the interphase reactance 40 permits two of the ignitron tubes T11, T2, T5 and T8 to operate in parallel when the four phase voltages from the secondary windings 2—8 and 5—11 of the transformers 22 and 25, respectively, are applied to the rectifier leads R11, R2, R5 and R8, respectively. In similar fashion, the interphase reactances 42 and 46 allow parallel operation of the ignitron tubes connected to the secondary windings of the transformers 21 and 24 and 23 and 26, respectively.

The invention is not limited to the particular interphase reactances 40, 42 and 46, which were chosen for illustration, as there are many other kinds and connections of interphase reactance means. The interphase reactances 40, 42 and 46 would be designed for the second harmonic of the fundamental frequency of the three-phase power-supply system at L1, L2 and L3. In a particular application, it might be advisable to add additional interphase reactance means (not shown) which would be of the three phase type and which would be designed to absorb the fourth harmonic voltage differences existing between the various phases of the voltages applied to the rectifier leads R1 to R12.

In general, the connections described above between the autotransformer 20, the single-phase transformers 21 to 26, the rectifier leads R1 to R12 and the ignitron tubes T1 to T12 may be described as a triple-Scott, twelve-phase, double-diametric connection. As previously described, the modified Scott connection between the autotransformer 20 and the single-phase transformers 21 to 26 produces across the secondary windings of the single-phase transformers 21 to 26, three double biphase, rectifier phase voltages, which, in effect, amount to twelve rectifier phase voltages each separated by 30° from one another. Each of the diametrically opposite ends of the secondary windings of the transformers 21 to 26 is connected through one of the rectifier leads R1 to R12 to one of the ignitron tubes T1 to T12, respectively, to obtain twelve-phase rectifier operation.

The operation of one pair of transformers 22 and 25 in the triple-Scott, double-diametric rectifier connection will now be considered. Because of the double-diametric connection of the secondary windings 2—8 and 5–11 of the transformers 22 and 25, respectively, through the rectifier leads R11 and R2, and R5 and R8, respectively, to the ignitron tubes T11, T2, T5 and T8, respectively, two of the latter ignitron tubes will be operating in parallel at any given instant of each voltage cycle. As previously described, any voltage differences existing between the outputs of the two ignitron tubes which are operating in parallel will be absorbed by the interphase reactance 40. The balance of the ignitron tubes T1, T10, T4, T7, T12, T3, T9 and T6 will operate in similar fashion so that at any given instant six of the twelve ignitron tubes T1 to T12 will be operating in parallel. This means that each ignitron tube conducts for 180° of each cycle of the three-phase power supply system at L1, L2 and L3. The conduction of six ignitron tubes in parallel will progress in phase sequence in accordance with the reference numbers of the ignitron tubes T1 to T12. As one ignitron tube ceases to conduct, the next ignitron tube in phase sequence will begin to conduct so that six ignitron tubes always conduct in parallel.

As previously described, the ignitron tubes T1 to T12 may be provided with any suitable ignitor energizing control circuit for energizing the ignitors 37 of the several tubes. As described, each of the ignitron tubes T1 to T12 constitutes a vapor-electric device, such as a mercury vapor gas tube, having a single-phase space current path between an anode means and a cathode means with each vapor electric device having its own cathode means. It is to be understood that the triple-Scott, double-diametric connection may be used with any of the well-known semiconductor rectifiers in which the maximum current rating of the rectifier is determined more by the peak current rather than by the average current carried by the semiconductor rectifier.

In the single form or embodiment, which is shown in the drawing for the invention, there is illustrated a twelve-phase rectifier system in which a mid-tap of a transformer winding is used for the return circuit of the rectifiers. It is to be understood, however, that in general a bridge-type rectifier connection can be used in which twice as many individual rectifiers are required as in the illustrated embodiment, and in which each of the twelve rectifier phases or circuits contains, in effect, two rectifiers in series with each other so that the voltages of the power leads can be doubled throughout.

It will be readily appreciated that the interphase reactances 40, 42 and 46 could be combined with the windings of said interphase reactances all disposed on a single magnetic core structure.

It should be noted that in case of a fault occurring in one of the ignitron tubes T1 to T12, the fault current flowing in the faulted tube would be limited by the full impedance of the entire secondary winding of one of the transformers 21 to 26 to which the faulted ignitron tube is connected.

The apparatus embodying the teachings of this invention has several advantages. The triple-Scott, double-diametric rectifier connection has the advantage of 180° conduction in each ignitron tube which makes greater use of the current-carrying capacity of available ignitron tubes or other asymmetrically-conducting devices in which the maximum current rating is determined more by the peak current than by the average current. This rectifier connection also has the advantage of lower peak current than many of the rectifier connections commonly used. In addition, voltage variations at the power leads L1, L2 and L3 of the three-phase power-supply system, which are unbalanced between the three phases, will affect at least several of the twelve-phase output voltages of the transformers 21 to 26, thus reducing differences in the average current values of the ignitron tubes T1 to T12 which might result from unbalanced voltages at the power leads L1, L2 and L3. The twelve-phase, triple-Scott, double-diametric rectifier connection also produces a smoother unidirectional current output at the direct-current buses D1 and D2 than for a six-phase rectifier connection.

An additional advantage is that there would be reduced fault current resulting from a fault occurring in an individual ignitron tube or rectifier device.

Since numerous changes may be made in the above-described apparatus and circuits and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. An electric power translation system, including: unidirectional current power leads; three-phase power leads; twelve-phase power leads; transformer means connected between said three-phase power leads and said twelve-phase power leads; a plurality of separate, single-phase, asymmetrically-conducting devices of a type in which the rating of each of said devices is determined more by the peak current than by the average current carried by each of said devices; said transformer means comprising an autotransformer and six transformers, each of said six transformers comprising a primary winding and a secondary winding having two diametrically opposite end connections, the primary windings of each pair of said transformers being connected to said autotransformer in a modified Scott connection to obtain three separate two-phase voltage outputs across said secondary windings, each of said outputs being displaced from the other of said two-phase outputs by a predetermined phase angle; means for connecting said asymmetrically-conducting devices between said unidirectional current power leads and the six pairs of diametrically opposite end connections of said secondary windings; and an interphase reactance means connected between one of said unidirectional current power leads and said secondary windings, said interphase reactance means comprising a plurality of magnetic core members, each of said core members having disposed thereon windings for absorbing the instantaneous voltage differences between the outputs of said devices which are necessary to permit half of said asymmetrically-conducting devices to operate in parallel with each other at all times.

2. An electric power translation system, including: unidirectional current power leads; three-phase power leads; twelve-phase power leads; transformer means connected between said three-phase power leads and said twelve-phase power leads; a plurality of vapor-electric devices, each having a single-phase space current path between an anode means and a cathode means, each of said vapor-electric devices having its own individual cathode means; said transformer means comprising an autotransformer and six other transformers, each of said other transformers comprising a primary winding and a secondary winding having two diametrically opposite end connections, the primary windings of each pair of said other transformers being connected to said autotransformer in a modified Scott connection to obtain three separate two-phase voltage outputs across said secondary windings, each of said two-phase outputs being displaced from the other of said outputs by a predetermined phase angle; means for connecting said vapor-electric devices between said unidirectional current power leads and the six pairs of diametrically opposite end connections of said secondary windings; and an interphase reactance means connected between one of said unidirectional current power leads and said secondary windings, said interphase reactance means comprising a plurality of magnetic core members, each of said core members having disposed thereon windings for absorbing the instantaneous voltage differences between the outputs of said devices which are necessary to permit half of said vapor-electric devices to operate in parallel with each other at all times.

3. An electric power translation system, including: unidirectional current power leads; three-phase power leads; twelve-phase power leads; transformer means connected between said three-phase power leads and said twelve-phase power leads; a plurality of separate mercury vapor gas tubes, each having a single-phase space current path between an anode means and a cathode means, each of said mercury vapor gas tubes having its own individual cathode means; said transformer means comprising an autotransformer and six transformers, each of said six transformers comprising a primary winding and a secondary winding having two diametrically opposite end connections, the primary windings of each pair of said transformers being connected to said autotransformer in a modified Scott connection to obtain three separate, two-phase voltage outputs across said secondary windings, each of said two-phase outputs being displaced from the other of said outputs by a predetermined phase angle; means for connecting said mercury vapor gas tubes between said unidirectional current power leads and the six pairs of diametrically opposite end connections of said secondary windings; and an interphase reactance means connected between one of said unidirectional current power leads and said secondary windings, said interphase reactance means comprising a plurality of magnetic core members, each of said core members having disposed thereon windings for absorbing the instantaneous voltage differences between the outputs of said tubes which are necessary to permit half of said mercury vapor gas tubes to operate in parallel with each other at all times.

4. An electric power translation system, including: unidirectional current power leads; three-phase power leads; twelve-phase power leads; transformer means connected between said three-phase power leads and said twelve-phase power leads; a plurality of separate, single-phase semiconductor rectifying devices of a type in which the rating of each device is determined more by the peak current than by the average current carried by each of said devices; said transformer means comprising an autotransformer and six transformers, each of said six transformers comprising a primary winding and a secondary winding having two diametrically opposite end connections, the primary windings of each pair of said transformers being connected to said autotransformer in a modified Scott connection to obtain three separate, two-phase voltage outputs across said secondary windings, each of said two-phase outputs being displaced from the other of said outputs by a predetermined phase angle; means for connecting said semiconductor rectifying devices between said unidirectional current power leads and the six pairs of diametrically opposite end connections of said secondary windings; and an interphase reactance means which is connected between one of said unidirectional current power leads and said secondary windings, said interphase reactance means comprising a plurality of magnetic core members, each of said core members having disposed thereon windings for absorbing the instantaneous voltage differences between the outputs of said devices which are necessary to permit half of said semiconductor rectifying devices to operate in parallel with each other at all times.

5. An electric power phase transformation system, including: three-phase power leads; six-phase power leads; transformer means connected between said three-phase power leads and said six-phase power leads; a load connected to said six-phase power leads; said transformer means comprising a three-phase autotransformer and six other single phase transformers, each of said other transformers having a primary winding and a secondary winding, the primary windings of each pair of said other transformers being connected to said autotransformer in a modified Scott connection to obtain three separate two-phase voltage outputs across said secondary windings, each of said two-phase outputs being displaced from the other of said two-phase outputs by a predetermined phase angle; and means for connecting said load to said secondary windings.

6. An electric power phase transformation system, including: three-phase power leads; three sets of two-phase power leads; transformer means connected between said three-phase power leads and said two-phase power leads, said transformer means comprising a delta connected three-phase autotransformer and six other single phase transformers, each of said other transformers having a primary winding and a secondary winding, the primary windings of each pair of said other transformers being connected to said autotransformer in a modified Scott connection to obtain three separate two-phase voltage outputs across said secondary windings, each of said two-phase outputs being displaced from the other of said two-phase outputs by a predetermined phase angle, said secondary windings being connected to said three sets of two-phase power leads; and a plurality of loads connected in a balanced arrangement with respect to each of said sets of two-phase power leads to maintain a balanced load on said three-phase power leads.

7. In an electric power translation system, the combination comprising, three-phase power leads, direct-current power leads, twelve-phase power leads, a three-phase autotransformer delta-connected to said three-phase power leads, three pairs of single-phase transformers each including a primary winding and a secondary winding having a mid-tap and two diametrically opposite end connections, the primary windings of each pair of said transformers being connected to said autotransformer in a modified Scott connection to provide three double biphase voltages across the associated secondary windings, each of said biphase voltages being separated from the other of said biphase voltages by substantially predetermined phase angles, a plurality of separate, single-phase, asymmetrically-conducting devices of a type in which the rating is determined more by its peak current than by the average current carried by each of said devices, the diametrically opposite end connections of each of said secondary windings being connected to said twelve-phase power leads, said asymmetrically-conducting devices being connected between said twelve-phase power leads and said direct-current power leads, and interphase reactance means connected between the mid-taps of said secondary windings and said direct-current leads for absorbing the voltage differences existing between the outputs of half of said devices which are operating in parallel.

8. In an electric power translation system, the combination comprising, three-phase power leads, direct-current power leads, twelve-phase power leads, a three-phase autotransformer delta-connected to said three-phase power leads, three pairs of single-phase transformers each including a primary winding and a secondary winding having a mid-tap and two diametrically opposite end connections, the primary windings of each pair of said transformers being connected to said autotransformer in a modified Scott connection to provide three double biphase voltages across the associated secondary windings, each of said biphase voltages being separated from the other of said biphase voltages by predetermined phase angles, a plurality of separate, single-phase semiconductor rectifying devices of a type in which the rating is determined more by its peak current than by the average current carried by each of said devices, the diametrically opposite end connections of each of said secondary windings being connected to said twelve-phase power leads, said semiconductor rectifying devices being connected between said twelve-phase power leads and said direct-current power leads, and interphase reactance means connected between the mid-taps of said secondary windings and said direct-current leads for absorbing the voltage differences existing between the outputs of half of said devices which are operating in parallel.

9. In an electric power translation system, the combination comprising, three-phase power leads, direct-current power leads, twelve-phase power leads, a three-phase autotransformer delta-connected to said three-phase power leads, three pairs of single-phase transformers each including a primary winding and a secondary winding having a mid-tap and two diametrically opposite end connections, the primary windings of each pair of said transformers being connected to said autotransformer in a modified Scott connection to provide three double biphase voltages across the associated secondary windings, each of said biphase voltages being separated from the other of said biphase voltages by predetermined phase angles, a plurality of separate, single-phase, asymmetrically-conducting devices of a type in which the rating is determined more by its peak current than by the average current carried by each of said devices, the diametrically opposite ends of each of said secondary windings being connected to said twelve-phase power leads, said asymmetrically-conducting devices being connected between said twelve-phase power leads and said direct current power leads, and an interphase reactance having a mid-tap connected between the mid-taps of the secondary windings of each pair of said transformers, the mid-tap of each interphase reactance being connected to said direct-current leads.

10. In an electric power translation system, the combination comprising, three-phase power leads, direct-current power leads, twelve-phase power leads, a three-phase autotransformer delta-connected to said three-phase power leads, three pairs of single-phase transformers each including a primary winding and a secondary winding having a mid-tap and two diametrically opposite end connections, the primary windings of each pair of said transformers being connected to said autotransformer in a modified Scott connection to provide three double biphase voltages across the associated secondary windings, each of said biphase voltages being separated from the other of said biphase voltages by predetermined phase angles, a plurality of separate, single-phase semiconductor rectifying devices of a type in which the rating is determined more by its peak current than by the average current carried by each of said devices, the diametrically opposite ends of each of said secondary windings being connected to said twelve-phase power leads, said semiconductor rectifying devices being connected between said twelve-phase power leads and said direct-current power leads, and an interphase reactance having a mid-tap connected between the mid-taps of the secondary windings of each pair of said transformers, the mid-tap of each interphase reactance being connected to said direct-current leads.

11. An electric power translation system, including: unidirectional current power leads; three-phase power leads; twelve-phase power leads including six pairs of diametrically opposite terminals, a plurality of transformers connected between said three-phase power leads and said twelve-phase power leads; a plurality of separate, single-phase, asymmetrically-conducting devices of a type in which the rating of each device is determined more by its peak current than by the average current carried by each of said devices; a triple-Scott, double-diametric connection means for providing twelve-phase connections for operatively connecting said asymmetrically-conducting devices between said unidirectional current power leads and the six pairs of diametrically opposite terminals of said twelve-phase power leads; and an interphase reactance means which is serially included in said connection means, said interphase reactance means comprising a plurality of magnetic core members, each of said core members having disposed thereon windings for absorbing the voltage differences existing between the outputs of half of said asymmetrically-conducting devices which are operating in parallel with each other at all times.

12. An electric power translation system, including: unidirectional current power leads; three-phase power leads; twelve-phase power leads including six pairs of diametrically opposite terminals; a plurality of transformers connected between said three-phase power leads and said twelve-phase power lead; a plurality of separate, single phase, asymmetrically-conducting devices of a type in which the rating of each of said devices is determined more by its peak current than by the average current carried by each of said devices; a triple-Scott, double-diametric connection means for providing twelve phase connections for operatively connecting said asymmetrically-conducting devices between said unidirectional current power leads and the six pairs of diametrically-opposite terminals of said twelve-phase power leads; and an interphase reactance means which is serially included in said connection means, said interphase reactance means comprising magnetic core means, said magnetic core means having disposed thereon windings for absorbing the voltage differences existing between the outputs of half of said asymmetrically-conducting devices which are operating in parallel with each other at all times.

References Cited in the file of this patent

UNITED STATES PATENTS

| | | |
|---|---|---|
| Re. 14,151 | Varley | June 13, 1916 |
| 1,843,521 | Smith | Feb. 2, 1932 |
| 1,993,221 | Meyer-Delius et al. | Mar. 5, 1935 |
| 2,022,341 | Meyer-Delius | Nov. 26, 1935 |